(12) United States Patent
Kanamori

(10) Patent No.: US 6,795,040 B2
(45) Date of Patent: Sep. 21, 2004

(54) DISPLAYING DEVICE FOR VEHICLE HAVING LIGHT SOURCES OF DIFFERENT DIRECTIVITIES

(75) Inventor: Naohito Kanamori, Yokkaichi (JP)

(73) Assignee: Denso Corporation, Kariya (JP)

( * ) Notice: Subject to any disclaimer, the term of this patent is extended or adjusted under 35 U.S.C. 154(b) by 290 days.

(21) Appl. No.: 10/060,386

(22) Filed: Feb. 1, 2002

(65) Prior Publication Data

US 2002/0135573 A1 Sep. 26, 2002

(30) Foreign Application Priority Data

Mar. 26, 2001 (JP) .................................. 2001-088591

(51) Int. Cl.⁷ .............................................. G09G 5/00
(52) U.S. Cl. ...................................... 345/7; 349/11
(58) Field of Search ................... 345/7, 8, 9; 349/11; 359/630, 631, 633, 634; 340/461, 464, 459, 525, 901

(56) References Cited

U.S. PATENT DOCUMENTS

| | | | | |
|---|---|---|---|---|
| 700,650 A | * | 5/1902 | Hubert | 362/208 |
| 5,035,473 A | * | 7/1991 | Kuwayama et al. | 359/13 |
| 5,475,512 A | * | 12/1995 | Nakazawa et al. | 359/13 |
| 5,781,243 A | | 7/1998 | Kormos | |
| 5,805,119 A | * | 9/1998 | Erskine et al. | 345/7 |
| 6,100,943 A | * | 8/2000 | Koide et al. | 349/11 |
| 6,262,848 B1 | * | 7/2001 | Anderson et al. | 359/630 |
| 6,359,737 B1 | * | 3/2002 | Stringfellow | 359/631 |
| 6,538,622 B1 | * | 3/2003 | Kojima et al. | 345/7 |
| 6,608,608 B2 | * | 8/2003 | Kanamori | 345/8 |
| 6,639,569 B2 | * | 10/2003 | Kearns et al. | 345/7 |

FOREIGN PATENT DOCUMENTS

| | | |
|---|---|---|
| JP | A-6-130317 | 5/1994 |
| JP | A-6-130383 | 5/1994 |

* cited by examiner

*Primary Examiner*—Amare Mengistu
*Assistant Examiner*—Nitin Patel
(74) *Attorney, Agent, or Firm*—Posz & Bethards, PLC

(57) ABSTRACT

A light source located in a rear part of an LCD panel has a first LED group and a second LED group. LEDs in the second LED group has higher directivity than LEDs in the first LED group and located above the LEDs in the second LED group. The LCD panel receives light emitted from the LEDs through a diffusion plate, and displays high priority information on an entire display surface of the LCD panel. It also receives light emitted from the LEDs, and displays low priority information on a partial display surface.

7 Claims, 6 Drawing Sheets

DISPLAYING DEVICE FOR VEHICLE HAVING LIGHT SOURCES OF DIFFERENT DIRECTIVITIES

CROSS REFERENCE TO RELATED APPLICATION

This application is based on and incorporates herein by reference Japanese Patent Application No. 2001-88591 filed on Mar. 26, 2001.

FIELD OF THE INVENTION

The present invention relates to an onboard displaying device for a vehicle including a head-up display.

BACKGROUND OF THE INVENTION

One type of head-up display for a vehicle is disclosed in JP-A-6-130317. It forms virtual images of information, including traveling speed and warning patterns of a vehicle, transmitted from a liquid crystal display (LCD) in front of a front windshield. Another type of head-up display is disclosed in U.S. Pat. No. 5,781,243. A night-vision camera captures scenes ahead of a vehicle and virtual images of the scenes are formed in front of the front windshield as a vision aid.

When displaying different kinds of information by a single head-up display as in those displaying devices, displayed images may be mixed up and visibility of a driver decreases. Switching information to be displayed based on road conditions is one way to counter this problem. As an example for improving visibility of a driver, a head-up display which changes colors of the entire display surface of the LCD based on kinds of information is disclosed in JP-A-6-130383. However, the sizes of the LCD and a light source of this head-up display become large. As a result, the installability decreases while the cost increases.

SUMMARY OF THE INVENTION

The present invention therefore has an objective to provide a displaying device for a vehicle to display different kinds of information by a single LCD panel with a compact light source, while maintaining good visibility.

Information for driving generally falls into two categories. One is a kind of information a driver may prefer to see in large images because it is necessary for driving. The other is a kind of information the driver may not need to see in large images because it is supplemental information for driving. These kinds of information are defined as high priority information and low priority information, respectively.

A displaying device for a vehicle of the present invention includes an LCD panel and a light source. The LCD panel displays the low priority information on a part of a display surface. It also displays the high priority information on a wider display surface which includes the narrow display surface.

Moreover, two types of light emitting devices, one for a large area and the other for a small area, are used for the light source. The light emitting device for a large area has higher directivity than the one for a small area. Therefore, the high priority information and the low priority information are selectively displayed with a light source which is still compact in size.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

The preferred embodiments of the present invention will be explained with reference to various embodiments in the accompanying drawings.

[First Embodiment]

Figure 1:
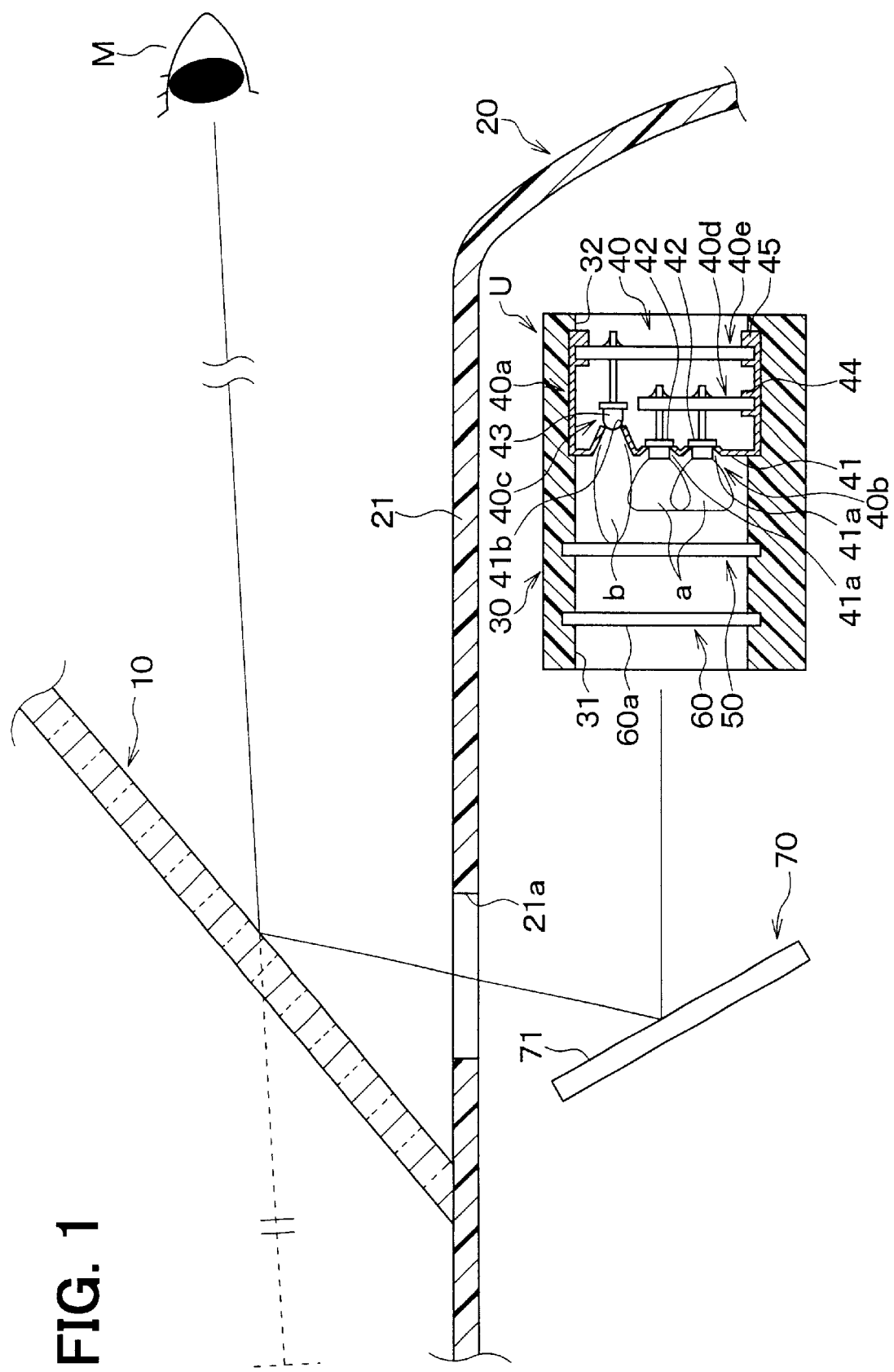
FIG. 1 is a sectional view showing a displaying device for a vehicle according to the first embodiment of the present invention.

Referring to FIG. 1, a head-up display for a vehicle includes a display unit U installed underneath a panel top 21 of an instrument panel 20. The display unit U includes a cylindrical casing 30, a light source 40, a light diffusion plate 50, and a translucent LCD panel 60. The casing 30 is placed behind the instrument panel 20 as its horizontal axis lies in the front-rear direction of the vehicle and supported by the instrument panel 20. A front end opening 31 and a rear end opening 32 of the casing 30 face toward the front and the rear of the vehicle, respectively.

The light source 40 includes a generally U-shaped cross-section frame 40a inserted into the rear part of the casing 30 as its horizontal axis lies coaxially with the casing 30. The frame 40a is installed in the rear part of the casing 30 as its front wall 41 faces toward the front of the vehicle.

Figure 2:
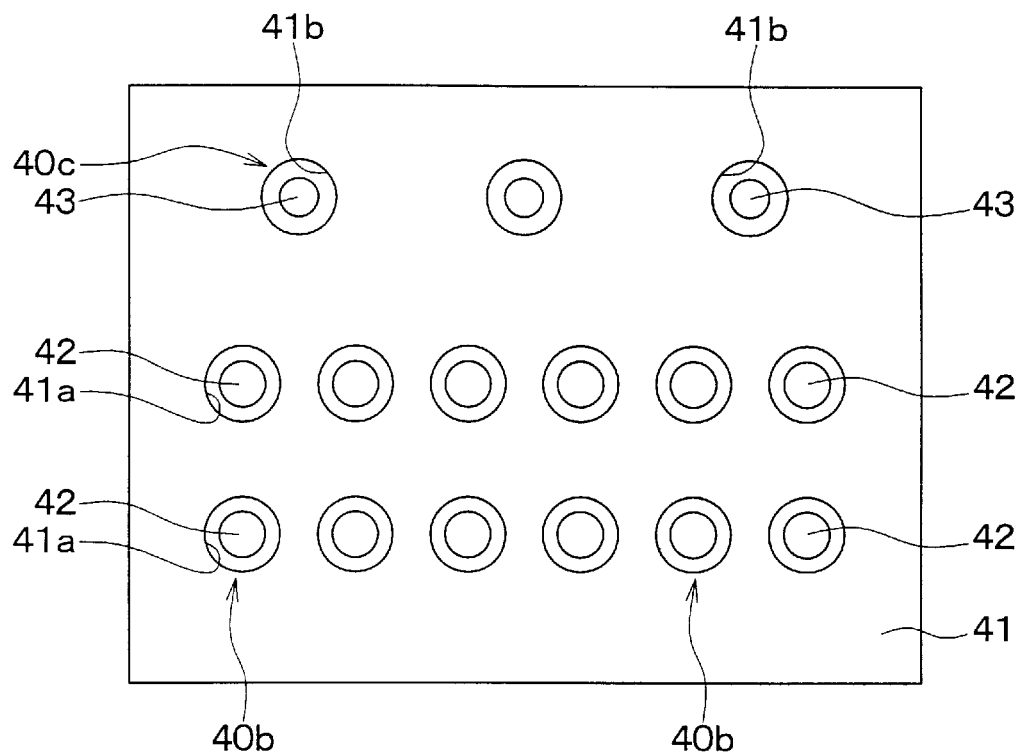
FIG. 2 is a front view of a light source in the first embodiment.

As shown in FIGS. 1 and 2, the light source 40 includes a first LED group 40b and a second LED group 40c. The first LED group 40b includes twelve LEDs 42. The holes 41a are placed in upper and lower lines, six holes for each, in approximately a bottom half of the front wall 41. The LEDs 42 are inserted in the holes 41a so that they emit light perpendicularly to the diffusion plate 50 and the LCD panel 60 through the front end opening 31. The second LED group 40c includes three LEDs 43. The holes 41b are placed in a horizontal line in an upper portion of the front wall 41. The LEDs 43 are inserted in the holes 41b so that they emit light perpendicularly to the diffusion plate 50 and the LCD panel 60 through the front end opening 31.

LEDs 42 with low directivity and LEDs 43 with high directivity are used for the first LED group 40b and the second LED group 40c, respectively. The LEDs 42 with low directivity have a large light distribution area around their optical axis. On the other hand, the LEDs 43 with high directivity have a light distribution area long in their optical axis direction and small in the orthogonal direction to the optical axis. Chip-type or dome-type white LEDs are used for the LEDs 42. Green LEDs are used for the LEDs 43.

The light source 40 includes wiring boards 40*d* and 40*e*. The wiring board 40*d* is placed in parallel with the front wall 41 as its lower end is fitted into a slot 44. The LEDs 42 are electrically connected with the wiring board 40*d* via lead terminals. The wiring board 40*e* is placed in parallel with and behind the wiring board 40*d*. The rim of the wiring board 40*e* is fitted into a slot 45. The LEDs 43 are electrically connected with the wiring board 40*e* via lead terminals.

Figure 3:
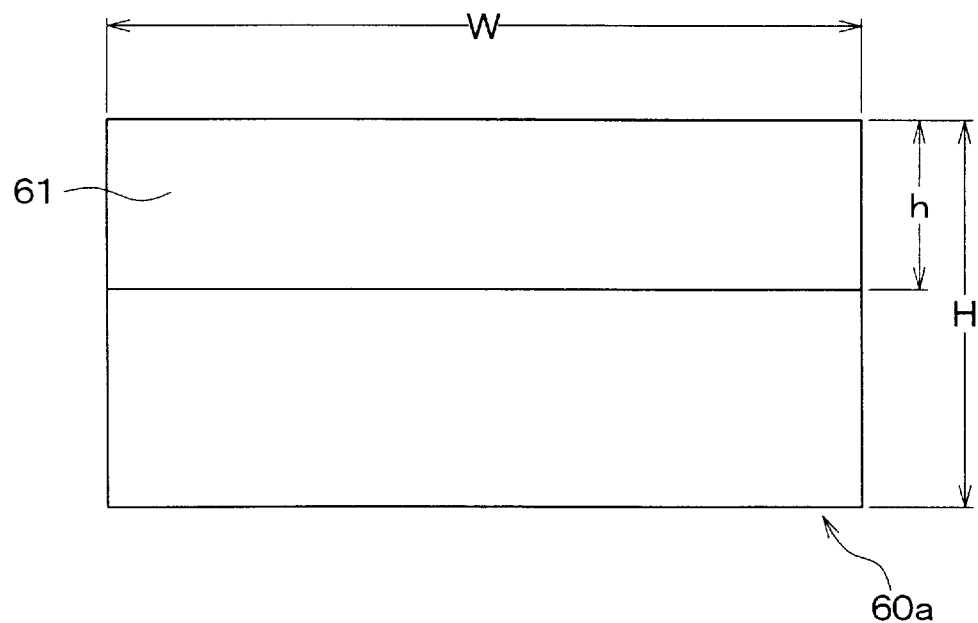
FIG. 3 is a schematic view showing a display surface of an LCD panel in the first embodiment.

The rim of the diffusion plate 50 is fitted into the interior wall of the casing 30. The diffusion plate 50 is placed in the middle part of the casing 30 orthogonal to the optical axis of the LEDs 42 and 43. Light from LEDs 42 and 43 is diffused by the diffusion plate 50 to provide the first diffused light and the second diffused light, respectively. The first diffused light impinges on an entire display surface 60*a* and the second diffused light impinges on a partial display surface 61, which is an upper part of the display surface 60*a* as shown in FIG. 3. As shown in FIG. 3, the entire display surface 60*a* is in a rectangular shape with a width W and a height H. The partial display surface 61 is also in a rectangular shape with the width W and a height h (e.g., h=appox. 2/5H).

The rim of the LCD panel 60 is fitted into the interior wall of the casing 30 near its front end opening 31. The LCD panel 60 receives any one of the first and second diffused light from the diffusion plate 50. The first diffused light is outputted as the first display light while the second diffused light is outputted as the second display light via the front end opening 31. The first display light is utilized for displaying the high priority information. On the other hand, the second display light is utilized for displaying the low priority information.

Under electronic control, the first diffused light impinges on the LCD panel 60, and the high priority information is displayed on the entire display surface 60*a*. Then, the high priority information is outputted as the first display light. The low priority information is also displayed on the partial display surface 61. Then, the low priority information is outputted as the second display light.

The head-up display includes a reflector 70 installed underneath the panel top 21. The reflector 70 is tilted so that its reflecting surface 71 is visible from both the windshield 10 through an opening 21*a* of the panel top 21 and the display surface 60*a*. The first or second display light reflected off the reflecting surface 71 is outputted to an interior surface of the front windshield 10 through an opening 21*a* of the panel top 21. Then, the display light is reflected in the opposite direction of driver's line of sight, and forms virtual images of the display information in front of the windshield 10.

Figure 4:
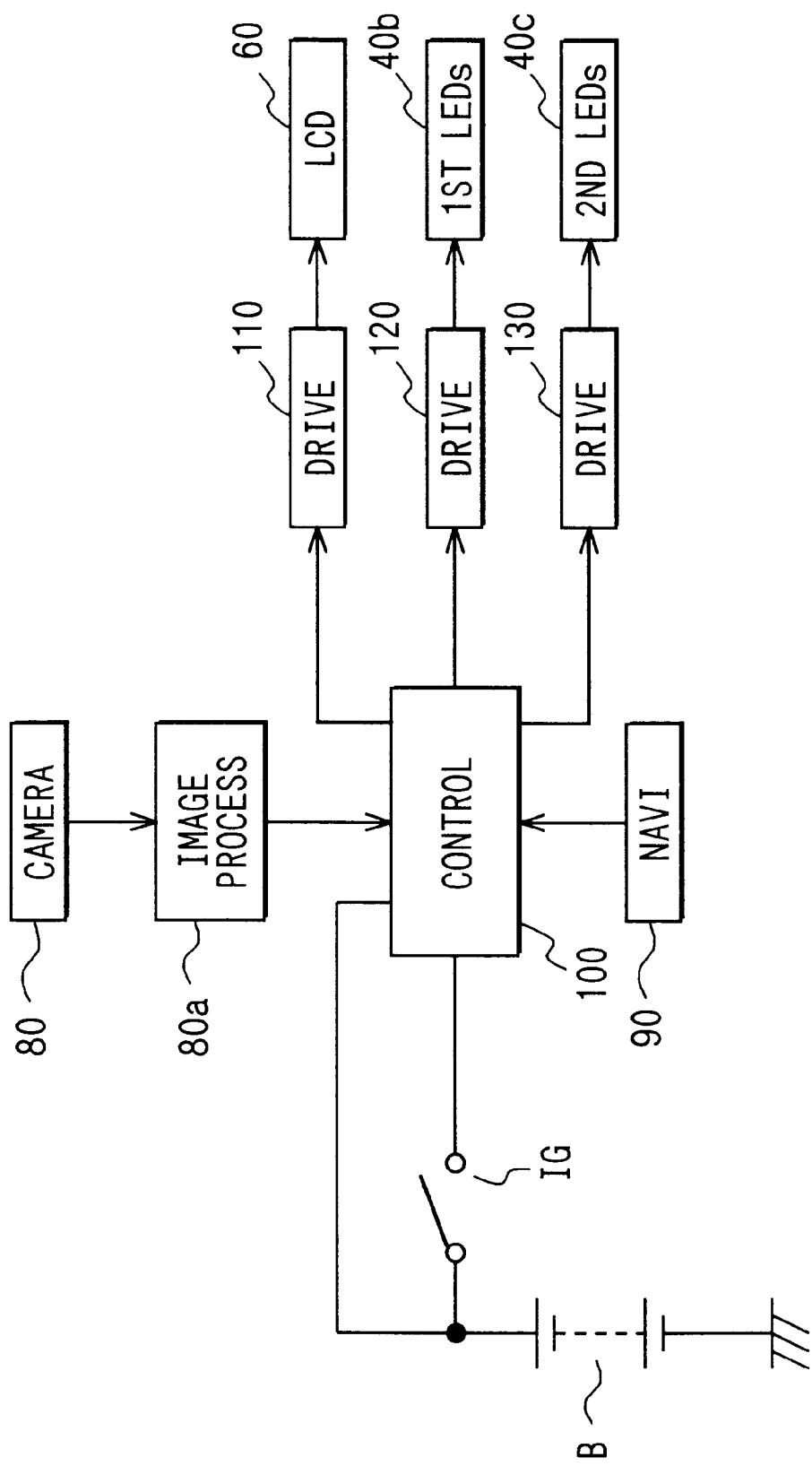
FIG. 4 is an electric block diagram showing the displaying device for a vehicle of the first embodiment.

Referring to FIG. 4, electrical components of the head-up display includes a camera 80, an image processing circuit 80*a*, a navigator 90, a control circuit 100, driving circuits 110, 120, and 130 for the LCD panel 60, the first LED group 40*b*, and the second LED group 40*c*. The camera 80, installed in the front part of the vehicle, takes images of scenes ahead of the vehicle, processes the image data, and outputs the processed image data as a signal. The onboard navigator 90 picks up navigation information for the vehicle and outputs it as data.

The control circuit 100 includes a microcomputer as its main component, and drives driving circuits 110, 120 and 130 for controlling displays on the LCD panel 60 and light emission of the first and second LED groups of LEDs 40 band 40*c*. A voltage is applied to various circuits including the circuit 100 from an onboard battery B via an ignition switch IG.

The control circuit 100 controls the driving circuit 110 to display the high priority information on the entire display surface 60*a*. This control is performed based on the image processing signals from the image processing circuit 80*a* along with the light emitting operation of the first LED group 40*b*. The control circuit 100 also controls the driving circuit 110 to display the low priority information on the display surface 61. This control is performed based on the navigation information from the navigator 90 along with the light emitting operation of the second LED group 40*c*.

The control circuit 100 determines which control to perform. For example, when the image processing signal indicates a crosswalk with white lines, it performs a control to display the high priority information. When the navigation information indicates a route or a distance from the current location to a destination, it performs a control to display the low priority information.

Figure 5:
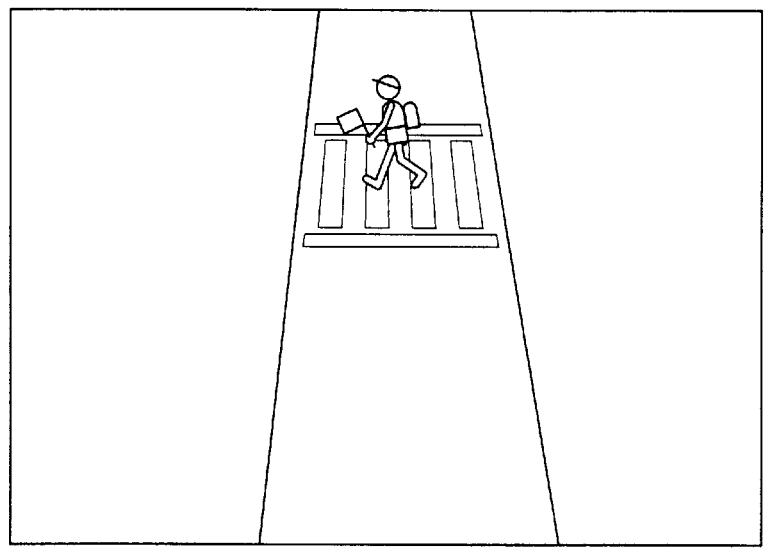
FIG. 5 is an exemplary view showing high priority information displayed as virtual images in the first embodiment.

When the vehicle is in motion with the switch IG being turned on, the voltage is supplied to the control circuit 100 by the battery B. The camera 80 takes an image of the crosswalk with white lines and a pedestrian crossing on as shown in FIG. 5. The image processing circuit 80 outputs the image data as an image processing signal. The control circuit 100 performs the light emitting operation of the first LED group 40*b* and displaying process of the high priority information according to the processed image signal.

The control circuit 100 drives the driving circuit 120 to control the LEDs 42 to emit light based on the light emitting operation directed by its microcomputer. The LEDs 42 emit white light toward the diffusion plate 50. The light diffused by the diffusion plate 50 then travels toward the LCD panel 60. Since the LEDs 42 are chip-type or dome-type LEDs, they have low directivity and a wide light distribution area. Therefore, the first diffused light impinges on the entire back surface of the LCD panel 60.

The control circuit 100 also drives the driving circuit 110 to display high priority information on the LCD panel 60 based on the image processing signal. Therefore, the LCD panel 60 displays the high priority information on the display 60*a*, utilizing the first diffused light. The first display light then impinges on the reflector 70. The first display light reflected off the reflecting surface 71 travels toward the interior surface of the front windshield 10 through the opening 21*a*. It is then reflected off the front windshield 10 in the opposite direction of driver M's line of sight, and forms virtual images of the display information in front of the windshield 10.

As shown in FIG. 5, the white virtual image of the crosswalk and the pedestrian are displayed in the area corresponding to the surface 60*a* in front of the windshield 10. Therefore, the driver sees the images in lager size. The first display light is inverted by the reflector 70 and forms virtual images in front of the windshield 10. As a result, the virtual images are inversions of the images displayed on the LCD panel 60.

When the navigator 90 outputs a travel route or navigation information, the control circuit 100 performs a light emitting operation for the second LED group 40*c* to switch the displayed information to the low priority information. The control circuit 100 drives the driving circuit 130 based on the light emitting operation to control the LEDs 43 to emit light.

The LEDs 43 emit green light toward the diffusion plate 50 which diffuses the light toward the LCD panel 60 as the second diffused light. The LEDs 43 has a long light distribution area in the axial direction and a small light distribution area in the orthogonal direction. Therefore, the green light is diffused from the upper portion of the diffusion plate 50, and impinges to the upper rear surface of the LCD panel 60.

The control circuit 100 drives the driving circuit 110 to display the low priority information on the LCD panel 60 based on the display process. The LCD panel 60 displays the low priority information on the display 61, utilizing the second diffused light. The second display light then impinges on the reflector 70. The second display light reflected off the reflecting surface 71 travels toward the interior surface of the front windshield 10 through the opening 21a. It is then reflected off the front windshield 10 in the opposite direction of driver M's line of sight, and forms virtual images of the display information in front of the windshield 10.

Figure 6:
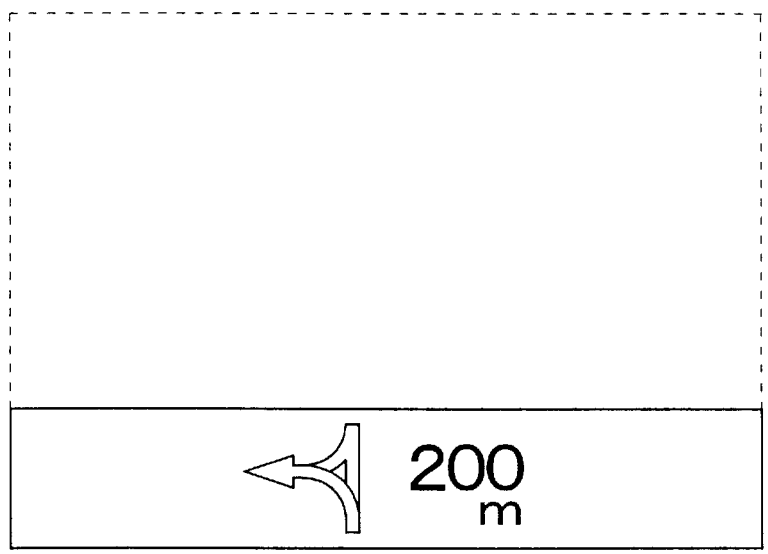
FIG. 6 is an exemplary diagram showing low priority information displayed as virtual images in the first embodiment.

As shown in FIG. 6, the green virtual images of a route and a distance from the current location to a destination are displayed in the area corresponding to the surface 61 in front of the windshield 10. Therefore, the driver M sees the images in smaller size. The second display light is inverted by the reflector 70 and forms virtual images in front of the windshield 10. As a result, the virtual images are inversions of the images displayed on the LCD panel 60.

The high priority information is displayed on the entire display surface 60a while the low priority information is displayed on the partial display surface 61. In other words, the two different kinds of information are displayed in front of the windshield 10 by a single LCD panel 10. To display information in such a manner, the LEDs in the first LED group 40b and the second LED group 40c are used as the light source for the LCD panel 10. The LEDs 42 of the first LED group 40b have low directivity, and LEDs 43 of the second LED group 40c have high directivity. As a result, the first and the second display information can be selectively displayed while the light source for the LCD panel 60 is still compact in size.

Utilizing LEDs which emit different colors of light also prevents upsizing of the light source for the LCD panel 60. In this embodiment, the LEDs 42 and the LEDs 43 emit white light and green light, respectively. Although the head-up display superimposes the virtual images on the real scene ahead of the vehicle, the virtual images are highly recognizable. This is because LEDs are used as light emitting components.

Figure 7:
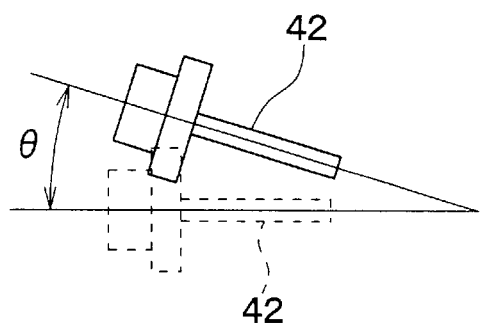
FIG. 7 is a side view of a light emitting diode installed differently from the first embodiment.

An alternative configuration of the first embodiment is shown in FIG. 7. The LEDs 42 are tilted at an angle of θ° from the position in the first embodiment (indicated in dashed lines). Referring to FIG. 1, they are inserted in supporting holes 41a of a frame 40a. The angle θ° is set so that the light from each LED 42 is utilized at a maximum after it is diffused by the diffusion plate 50. Other configurations are the same as in the first embodiment.

Since the LEDs 42 are tilted, white light emitted from the LEDs 42 is more effectively utilized as the first diffused light than that in the first embodiment. Therefore, the brightness of virtual images of high priority information becomes higher than in the case of the first embodiment. In other words, the virtual images of the high priority information are brighter than the real scene and highly recognizable even though they are superimposed on the scene.

[Second Embodiment]

Figure 8:
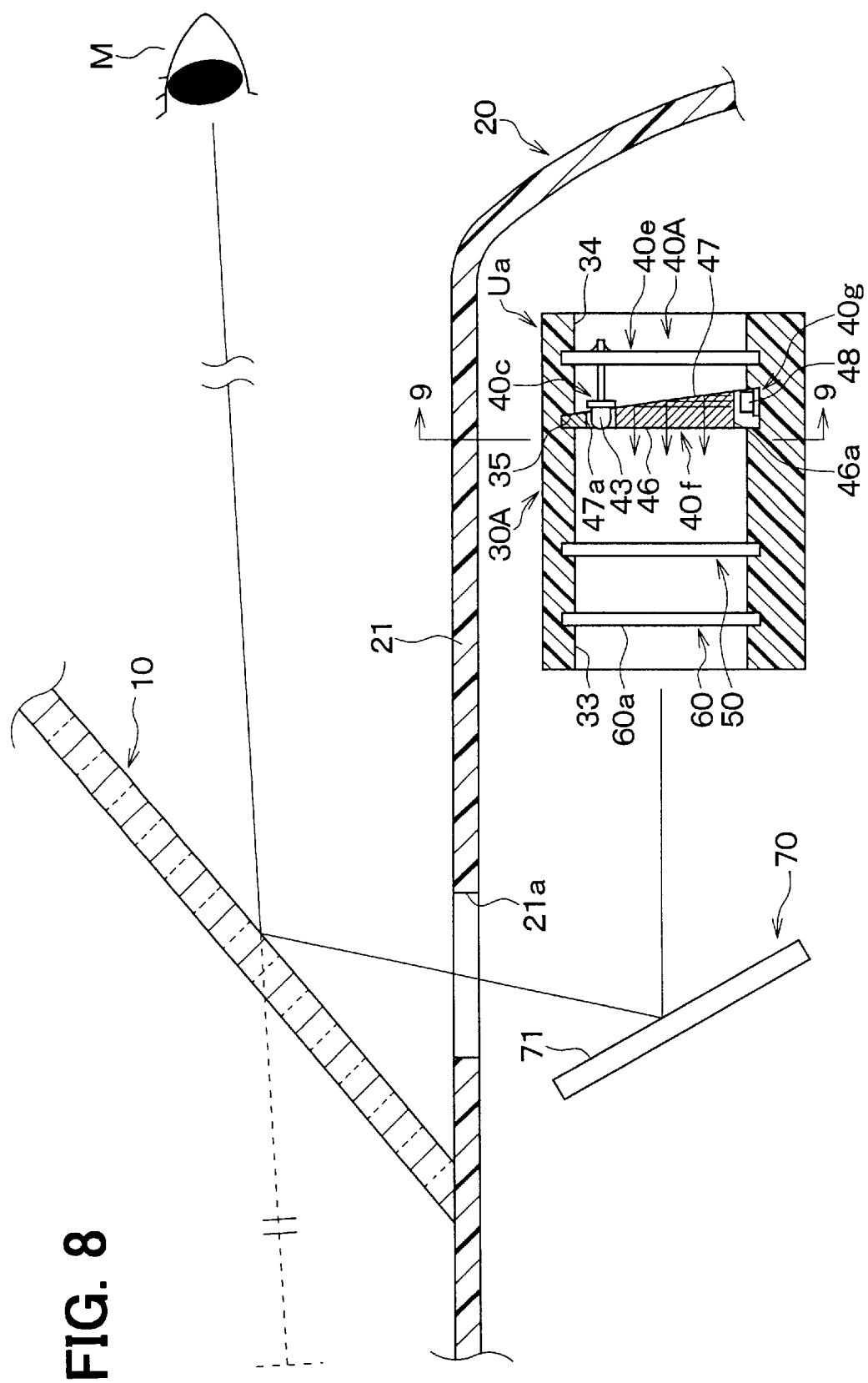
FIG. 8 is a sectional view showing a displaying device for a vehicle according to the second embodiment of the present invention.
Figure 9:
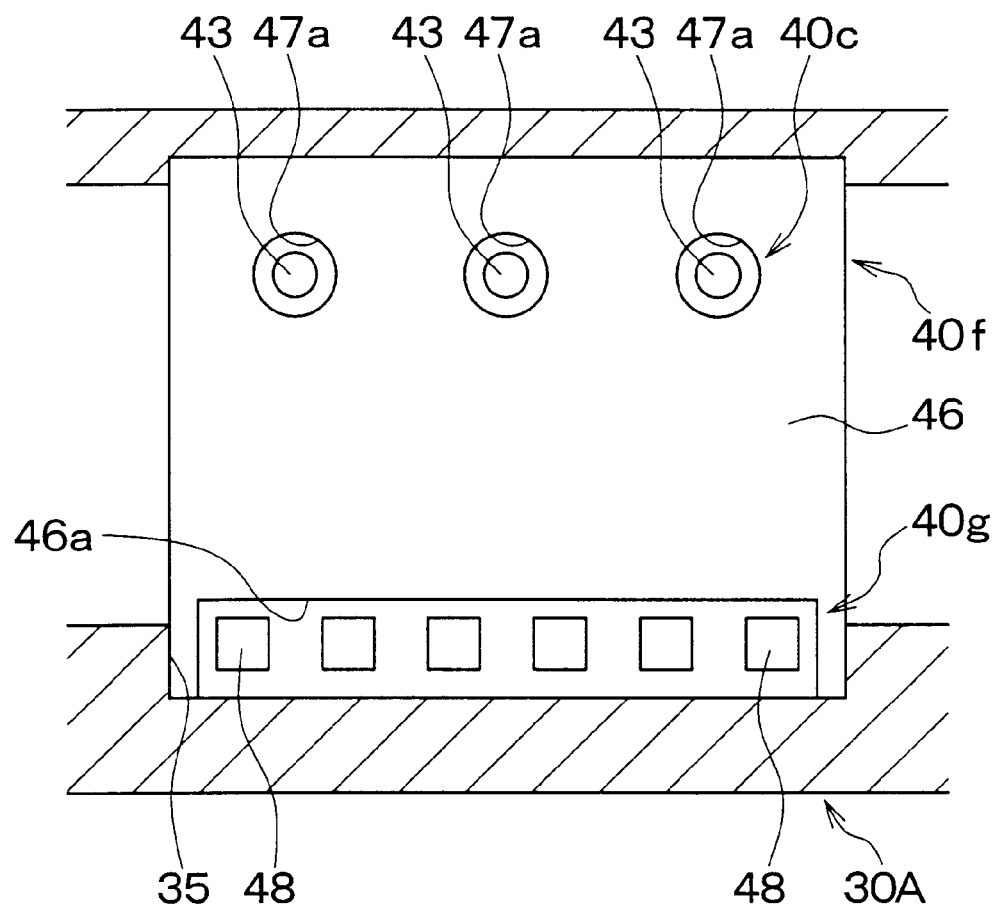
FIG. 9 is a front view of a light source in the second embodiment.

As shown in FIGS. 8 and 9, a head-up display has a display unit Ua replacing the display unit U of the first embodiment. The display unit Ua has a cylindrical casing 30A, a light source 40A, a light diffusion plate 50, and an LCD panel 60. The front end opening 33 of the casing 30A faces the reflecting surface 71 of a reflector 70, and the rear end opening 34 faces the rear of a vehicle.

The light source 40A is installed in the rear portion of the casing 30A, and includes the first LED group 40g of LEDs, the second LED group 40c, and a wiring board 40e. A light conductive plate 40f in a cross-sectional shape of a generally right triangle is inserted in an annular shaped slot 35. The thickness of the plate 40f increases as it goes toward the bottom. The plate 40f is placed so that its front surface is orthogonal to the horizontal axis of the casing 30A. The plate 40f is made of a clear, colorless light conductive material.

Six LEDs 48 are included in the first LED group 40g. The bottom portion of the light conductive plate is cut out for the LEDs 48 to be installed in a row inside the bottom annular shaped slot 35. The LEDs 48 are the same type of LEDs as the LEDS 42 and placed to face the top interior surface 46a of the cut-out. White light emitted from the LEDs 48 enters into the plate 40f through the upper portion of the top interior surface 46a. The plate 40f then reflects the white light at its rear surface 47 and outputs it through its front surface 46.

LEDs 43 in the second LED group 40c are placed in the supporting holes 47a. The illuminant part of the LEDs 43 faces toward the front end opening of the casing 30A. The edges of the wiring board 40e are inserted into the interior wall of the casing 30A in the rear portion of the casing 30A. The diffusion plate 50 is placed near the front end opening 33 so that it faces the front surface 46. The edges of the diffusion plate 50 are inserted into the interior wall of the casing 30A. Light emitting operation of the LEDs 48 are conducted under the electronic control in the similar manner as in the first embodiment.

The control circuit 100 drives the driving circuit 120 to control the LEDs 48 to emit light based on the light emitting operation for the first LED group 40g. White light emitted from the LEDs 48 enters into the light conductive plate 40f through the top interior surface 46a of the cut-out. It is then reflected off the rear surface 47 toward the front surface 46, and travels toward the diffusion plate 50.

The diffusion plate 50 diffuses the light from the light conductive plate 40f, and inputs it into the LCD panel 60 through its entire rear surface. The LCD panel 60 then outputs the first display light for the high priority information through the entire display surface 60a onto a reflecting surface 71. Virtual images of the high priority information are formed in front of a front windshield 10. Displaying the low priority information on the LCD panel 60 and forming its virtual images in front of the windshield are performed in the same manner as in the first embodiment. Therefore, the same results as in the first embodiment can be achieved.

Various modifications and alternations are possible. For example, the displaying device may be applied as a displaying device mounted near a driver-side opening of an instrument panel. In this case, the display unit U or Ua is configured so that its front end opening faces toward a driver's seat through the driver-side opening. A driver can see the first and second display information corresponding to the virtual images in the above embodiments on the LCD panel 60 while the effectiveness of the light source is maintained.

The camera 80 can be a night-vision camera. Illuminants including an electroluminescence panel can be used instead of the LEDs 40*b* of the first embodiment, or a light conductive plate 40*f* and the LEDs in the first LED group 40*g* of the second embodiment. A white light bulb or other light emitting components having same light distribution characteristics as the LEDs 42 or 48. Luminescent colors of the LEDs 42 or 48 and the LEDs 43 can be the same. They are not limited to white or green.

The light source can be installed in opposite position to the one in the first embodiment. In this case, virtual images formed in front of the windshield 10 as in FIG. 6 are moved to the upper portion of the dashed line area. However, the same effectiveness as the first embodiment can be obtained. Different types of reflectors can be used instead of the reflector 70. The applications of the present invention should not be limited to head-up displays for passenger vehicles. It can be applied to head-up displays for different types of vehicles.

The present invention may be implemented in many other ways without departing from the spirit of the invention.

What is claimed is:

1. A displaying device for a vehicle comprising:

an LCD panel having a first display surface and a second display surface included in the first display surface, wherein the first display is taller than the second display;

a light source including a first light emitting device that emits light for the first display surface and a second light emitting device that emits light for the second display surface; and control means for controlling the LCD panel to display high priority information on the first display surface and low priority information on the second display surface, wherein the second light emitting device has higher directivity than the first light emitting device, the control means performs a controlling operation so that the first light emitting device emits light when displaying the high priority information on the first display surface and the second light emitting device emits light when displaying the low priority information on the second display surface, the first light emitting device for the first display surface includes a plurality of light emitting diodes, the second light emitting device for the second display surface includes a plurality of light emitting diodes which are fewer in number than the light emitting diodes of the first light emitting device, and the first light emitting diode is tilted at a predetermined angle perpendicular to the LCD panel.

2. A display device for a vehicle as in claim 1, further comprising:

a diffusion plate placed between the LCD panel and the light source.

3. A display device for a vehicle as in claim 1, wherein:

the first light emitting device and the second light emitting device are placed so that the first light emitting device and the second light emitting device are separated from each other.

4. A display device for a vehicle as in claim 1, further comprising:

a light conductive plate made of a clear, colorless light conductive material.

5. A displaying device for a vehicle as in claim 1, wherein:

the light source is installed behind an instrument panel which is located in an interior of the vehicle below a windshield;

the LCD panel is installed at a light emitting side of the light source behind the instrument panel;

a reflector is positioned to face both an interior surface of the windshield and the display surface of the LCD panel; and the control means performs a control operation so that virtual images of the low priority information and the high priority information are formed in front of the windshield when display light is reflected off the reflector toward the interior surface of the front windshield through an opening of a panel top.

6. A displaying device for a vehicle as in claim 1, further comprising:

an image capturing means included in the control means for capturing images of scenes ahead of the vehicle which are displayed in large size; and a low priority information output means included in the control means for outputting driving information which is displayed in small size, wherein the control means performs a controlling operation so that the high priority information is displayed on the first display surface in response to an output of the image capturing means and the low priority information is displayed on the second display surface in response to an output of the low priority information outputting means.

7. A displaying device for a vehicle as in claim 1, wherein:

a light color of the first light emitting device differs from that of the second light emitting device.

* * * * *